United States Patent
Hagan (10) Patent No.: US 7,260,735 B2
(45) Date of Patent: Aug. 21, 2007

(54) METHOD AND SYSTEM FOR MAINTAINING A RUNNING COUNT OF EVENTS UPDATED BY TWO ASYNCHRONOUS PROCESSES

(75) Inventor: Stephen C. Hagan, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 664 days.

(21) Appl. No.: 10/741,319

(22) Filed: Dec. 18, 2003

(65) Prior Publication Data
US 2005/0138639 A1   Jun. 23, 2005

(51) Int. Cl.
  *G06F 1/04* (2006.01)
(52) U.S. Cl. .................. 713/502; 713/500; 713/501
(58) Field of Classification Search ............ 713/500, 713/501, 502
See application file for complete search history.

(56) References Cited

U.S. PATENT DOCUMENTS

| | | | |
|---|---|---|---|
| 4,140,087 A * | 2/1979 | Daumer et al. ............. 123/486 |
| 5,263,361 A * | 11/1993 | Gates ........................ 73/45.5 |
| 6,631,167 B1 * | 10/2003 | Cambonie et al. .......... 375/260 |
| 6,940,516 B1 * | 9/2005 | Dotson ....................... 345/537 |
| 2004/0208383 A1 * | 10/2004 | Bossen ....................... 382/247 |

* cited by examiner

*Primary Examiner*—Chun Cao
*Assistant Examiner*—Malcolm D Cribbs
(74) *Attorney, Agent, or Firm*—Suiter Swantz PC LLO (57) ABSTRACT

A method of maintaining a count of active events of a process is provided by a start counter and a complete counter. The start counter maintains a first count of start events and may be operated upon only by the start event of the process. The complete counter maintains a second count of complete events and may be operated upon only by the complete event of the process. The count of active events is established by determining the difference between the first and second counts. The present invention further provides for re-setting the first and second counts of the start and complete counters, respectively, when one or both of the counters have reached a maximum count value.

22 Claims, 6 Drawing Sheets

METHOD AND SYSTEM FOR MAINTAINING A RUNNING COUNT OF EVENTS UPDATED BY TWO ASYNCHRONOUS PROCESSES

FIELD OF THE INVENTION

The present invention generally relates to the field of computers, and particularly to a method for maintaining a running count of events updated by two asynchronous processes.

BACKGROUND OF THE INVENTION

Figure 1:
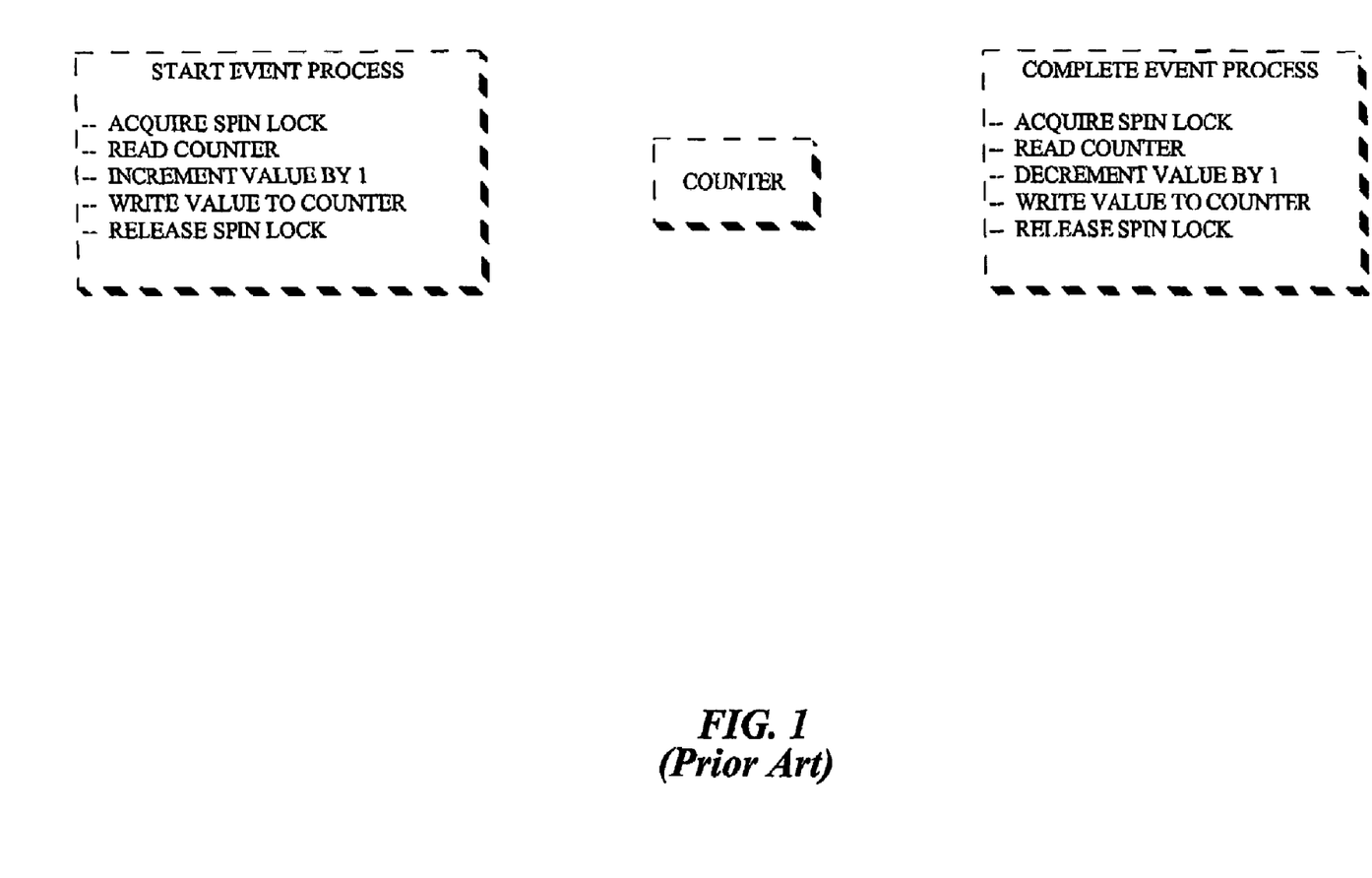
FIG. 1 is a block diagram representation of an exemplary spin lock dependent system known in the art.

Many computer programs require maintaining a running count of active events. Active events may be conditions, states, external processes, essentially any entity that needs to be counted along with the necessity for the number of these active at any given time to be known to a program or process. In a single processor system, this may be implemented with a simple counter, which is incremented when an event is started and decremented when an event completes. This same simple counter method may also be used in a multi-processor system under two conditions: 1) A single executing process is used to both start and complete the events (and update the counter); or 2) Two different executing processes are used, one to start events and another to complete events. In the latter case, a spin lock must be obtained by either process before updating the counter to ensure that the other process is not executing at that time. A spin lock being a lock that a processor is continuously trying to acquire, spinning around a loop, in order to perform/execute the process. An exemplary spin lock dependent system may be seen in FIG. 1.

On a multi-processor system it is more efficient to use multiple processes to perform tasks, as multiple processes can run simultaneously (in parallel). However, with the separate Start and Complete event processes shown in FIG. 1, it is necessary to utilize a spin lock to "synchronize" the two processes together before updating the counter. Each process must acquire (own) the spin lock before proceeding. If the spin lock is already owned by another process, the acquiring process will wait until the spin lock is released by the other process. This results in wasted processor cycles and causes these two processes to run as if they were a single executing process (no parallel execution).

If no spin lock is used with two separate processes, there is the possibility that both processes may read the counter at about the same time, and then each process would update the value and write it back to the counter. Whichever process wrote their value back last would overwrite the value of the other process, thereby losing the counter update of that process.

It is much more efficient to allow both of these processes to run in parallel. Therefore, it would be desirable to provide different method for maintaining a running count of active events.

SUMMARY OF THE INVENTION

Accordingly, the present invention provides a method and system for enabling multiple processes, such as two asynchronous processes, to update the count of active events without risking the loss of one of the updates. Through use of two physical counters a "virtual" running count of active events may be maintained and updated. Thus, the multiple processes may run simultaneously which may advantageously increase the efficiency of the execution of the multiple processes.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 2:
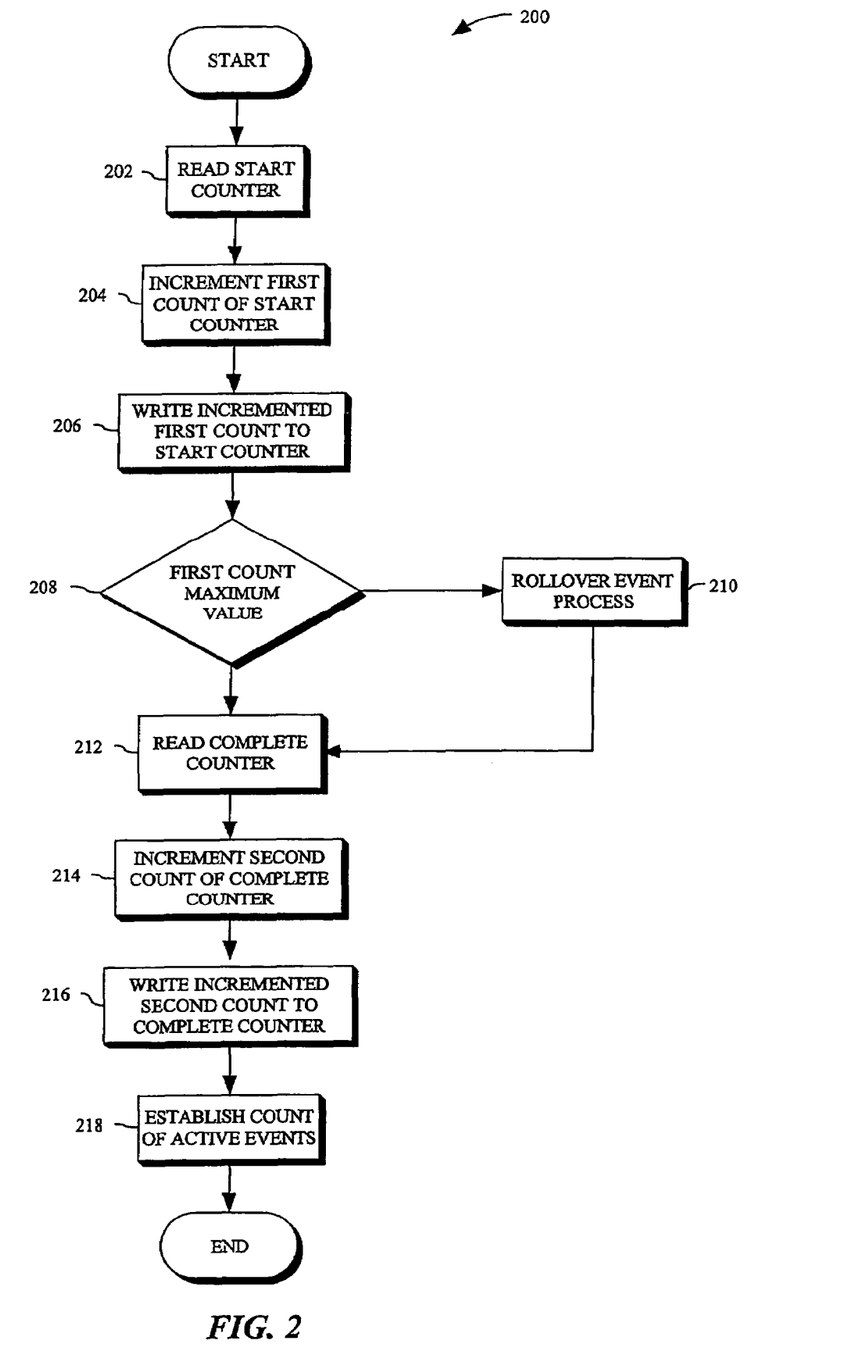
FIG. 2 is a flowchart illustrating a method of maintaining a running count of active events in accordance with an exemplary embodiment of the present invention.

Referring generally now to FIG. 2, in an exemplary method 200 of the present invention, a first and second process enable a first and second counter to maintain a running count of active events being performed by a computer, shown and described below in FIG. 5. It is understood that the present invention may be enabled using a single process or more than two processes which operate upon a computer. The first process enables a start event which directs the first counter (start counter). The second process enables a complete event process which directs the second counter (complete counter). It is contemplated that the first and second processes may be executed from various locations, such as various memory locations. For instance, the first and second processes may be executed from a memory location within the computer, various media readable by the computer, and the like. It is further contemplated that the first and second processes may be enabled to control the functionality of more than two counters. It is understood that the first and second counters are two distinct physical locations. The location of the two counters may vary within the memory caches established within the computer. In the present exemplary method, when various components of the computer are being initialized, the start event process, in step 202, reads the start counter to establish a first value. In the present invention, the first value is a first count, thus, the first counter is enabled using incremental unit values (e.g., 1, 2, 3 . . . n). The start event may then increment the value of the first count by 1, in step 204. It is understood that the incrementation of the first count may vary in size/magnitude. For instance, the start event may increment by a count of two or more. It is further understood that the start event may have its incremental value variously established by the various processes initializing the various computer components. After the start event has incremented the value, in step 206 it then writes the incremented value to the first (start) counter. The start event then determines if the first count of the first counter has reached a maximum value in step 208 which may require the operation of a rollover event process which is described in detail below. If it is determined that the first counter has reached the maximum value then in step 210 the rollover event is initiated. However, if the first count of the first counter is determined not to be at the maximum value the start event provides no further activity.

The complete event process is initiated at the completion of an event. The complete event process reads the second counter (complete counter) in step 212. The complete counter may be enabled with a second count, using similar unit value representations as described for the first counter. The complete event increments the second count, in step 214, in a similar manner as that described for the start event. Once the second count value is incremented, in step 216 the incremented value is written back to the second counter establishing a new second count. After updated values are written to the first and second counters of the present invention, a running count of active events may be established in step 218 by comparing the first counter with the second counter. In this manner the present invention enables the maintenance of a running count of active events by updating a first and second counter. It may be seen that the number of active events may be established at various times through a comparison which involves taking the difference between the first count (number of started events) from the first counter and the second count (number of completed events) from the second counter. Other comparison techniques as may be contemplated by those skilled in the relevant art may be employed without departing from the scope and spirit of the present invention.

It is contemplated that the count of active events may be reported in various manners. For example, a numeric count may be established on a display which is constantly updated as the number of active events changes. Other symbolic representations of active events may be established as contemplated by those of ordinary skill in the art.

It is understood that the values of the first and second counters may be changed during the time it takes to calculate the number of active events running. The present invention contemplates that this condition may be accounted for by the execution of special handling routines, and the like.

Figure 3:
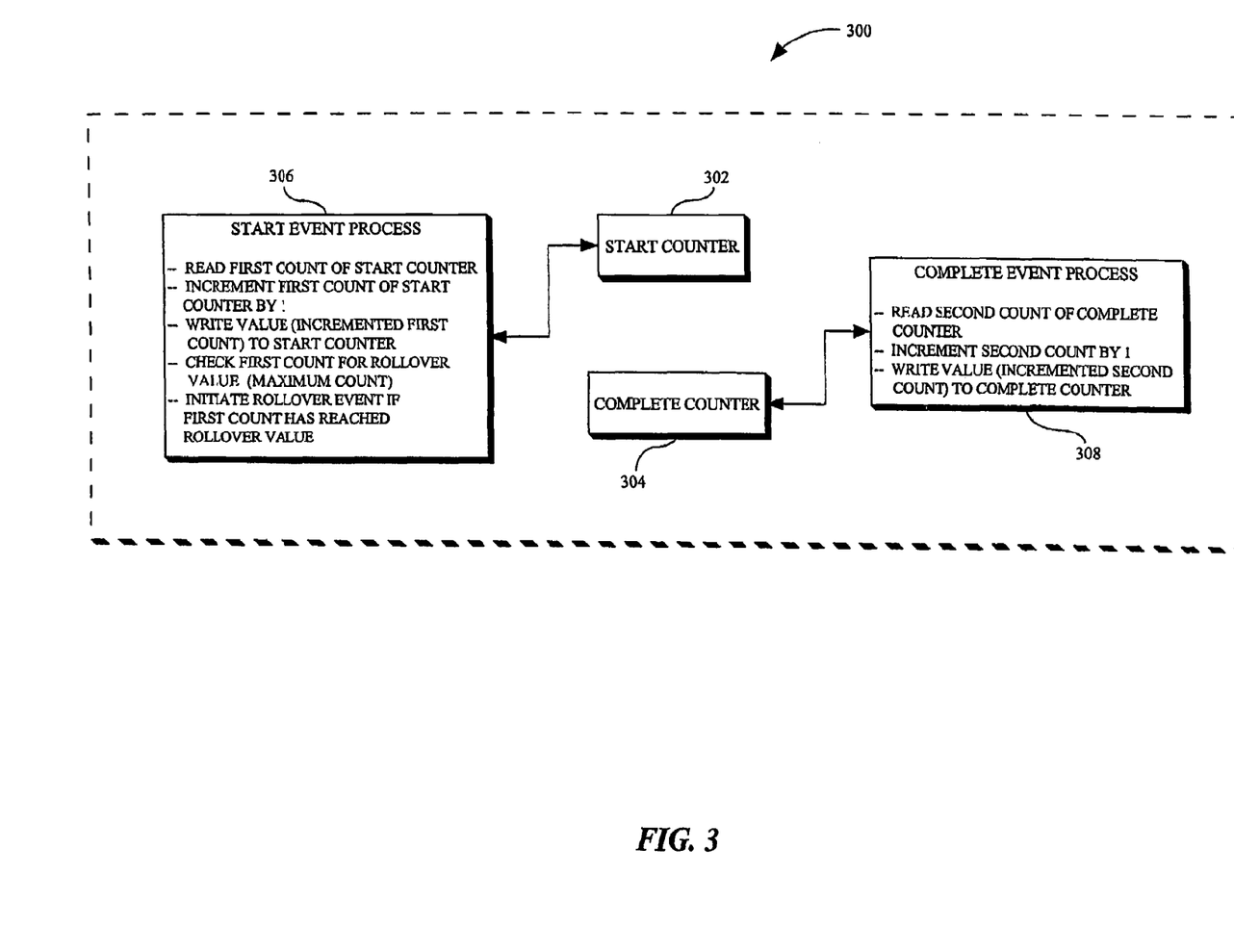
FIG. 3 is a block diagram representation of a counter employing the method of maintaining a running count of active events in accordance with an exemplary embodiment of the present invention.

A counter 300 in accordance with the present invention, shown in FIG. 3, preferably includes a first counter 302 and a second counter 304. The first and second counters may be operated upon by a first (start) event process 306 and a second (complete) event process 308. In the preferred embodiment, the first event process 306 is the start event which comprises the initialization of the process. The second event process 308 is a complete event which comprises the completion of the process. Thus, in operation the first counter 302 may be a Start counter and the second counter 304 may be a complete counter. The first and second counter 302 and 304 may be established in various locations as contemplated by those of ordinary skill in the relevant art. For example, the first and second counters may be established in memory locations upon a processor of a computer or at various cache locations within the memory hierarchy.

Synchronization between the first event process 306 and second event process 308 may not be required because the start counter 302 may be updated only by the first event process 306 and the complete counter 304 may be updated only by the second event process 308. It is contemplated that the first and second event processes may read either of the first and second counters. However, the first event process 306 may only update the first counter 302 and the second event process 308 may only update the second counter 304.

In order to maintain a virtual count of active events, both the first and second event processes increment their own counter for each start or completion of the event. In a preferred embodiment, the counters are initialized to a zero value. The start counter 302 may keep a count of how many events have been started, and the complete counter 304 may keep a count of how many events have been completed. It is understood, either of the first or second event processes may read both the start and complete counter, subtract the complete counter value (second count) from the start counter value (first count), and the difference is the count of active events at that time. For example, the start event process may read the start counter 302 and the complete counter 304; subtract the value (second count) of the complete counter 304 from the start counter 302, thereby determining the count of active events currently being executed. It should be noted that when a process reads the start counter 302 and complete counter 304, either of these counters may immediately change after being read.

Typically, a running active event counter may be used to detect a threshold value of active events. This running count may enable the execution of special handling routines. In the preferred embodiment, the actual count of active events monitored by the start counter 302 may be no greater than the computed count, thereby ensuring that any pre-determined threshold has not been exceeded without detection. This may be the case because the only operation that can occur to affect the running count of total active events is an increment of the complete counter 304, which would cause the active event count to decrease.

The size (capacity) of the counter 300 may vary, however, in preferred embodiments the size may be those that are natively supported by the processor architecture. For example, on a 32-bit processor a 32-bit counter may be preferred. It is understood that the size of the counter 300 may be different from the native processor architecture without departing from the scope and spirit of the present invention.

Figure 4:
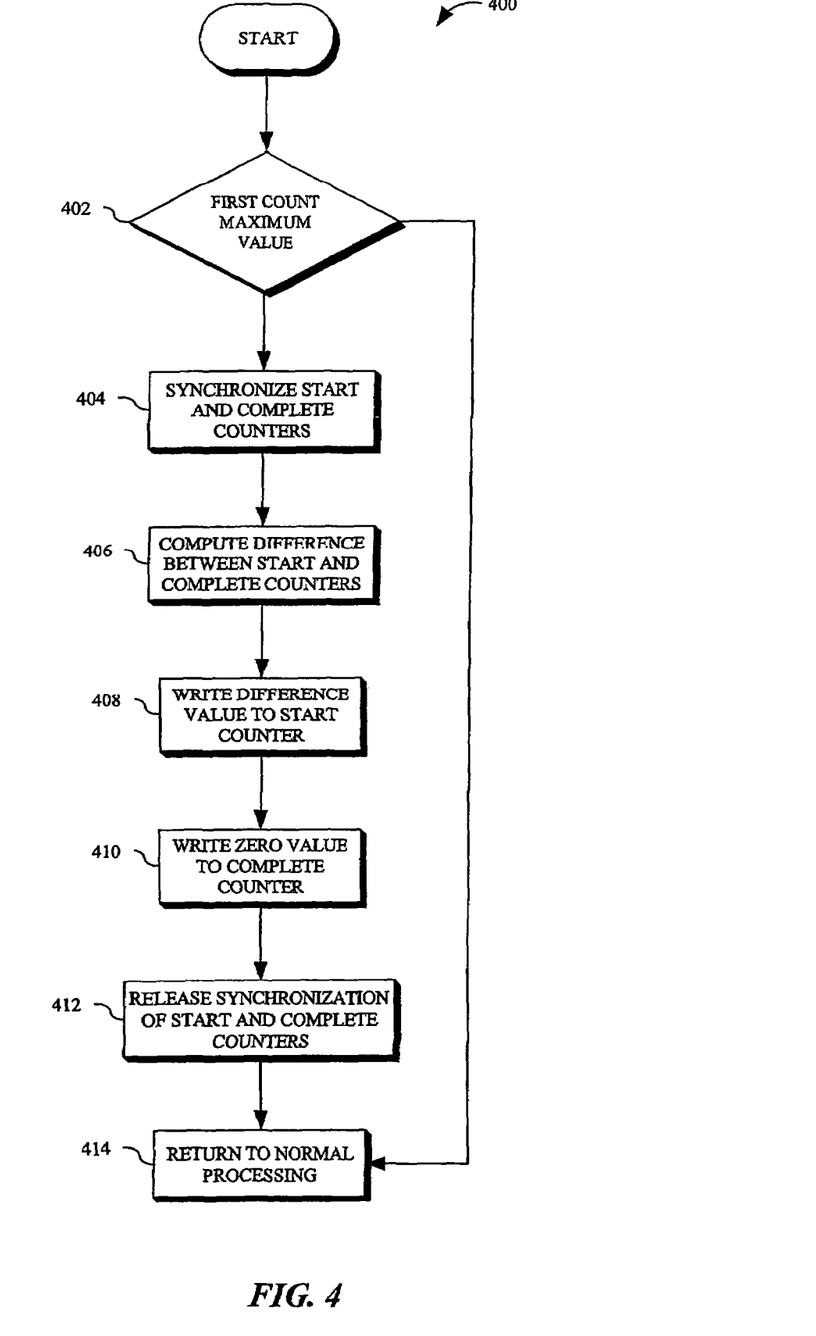
FIG. 4 is a flowchart illustrating a rollover event process for adjusting the counter in accordance with an exemplary embodiment of the present invention.
Figure 6:
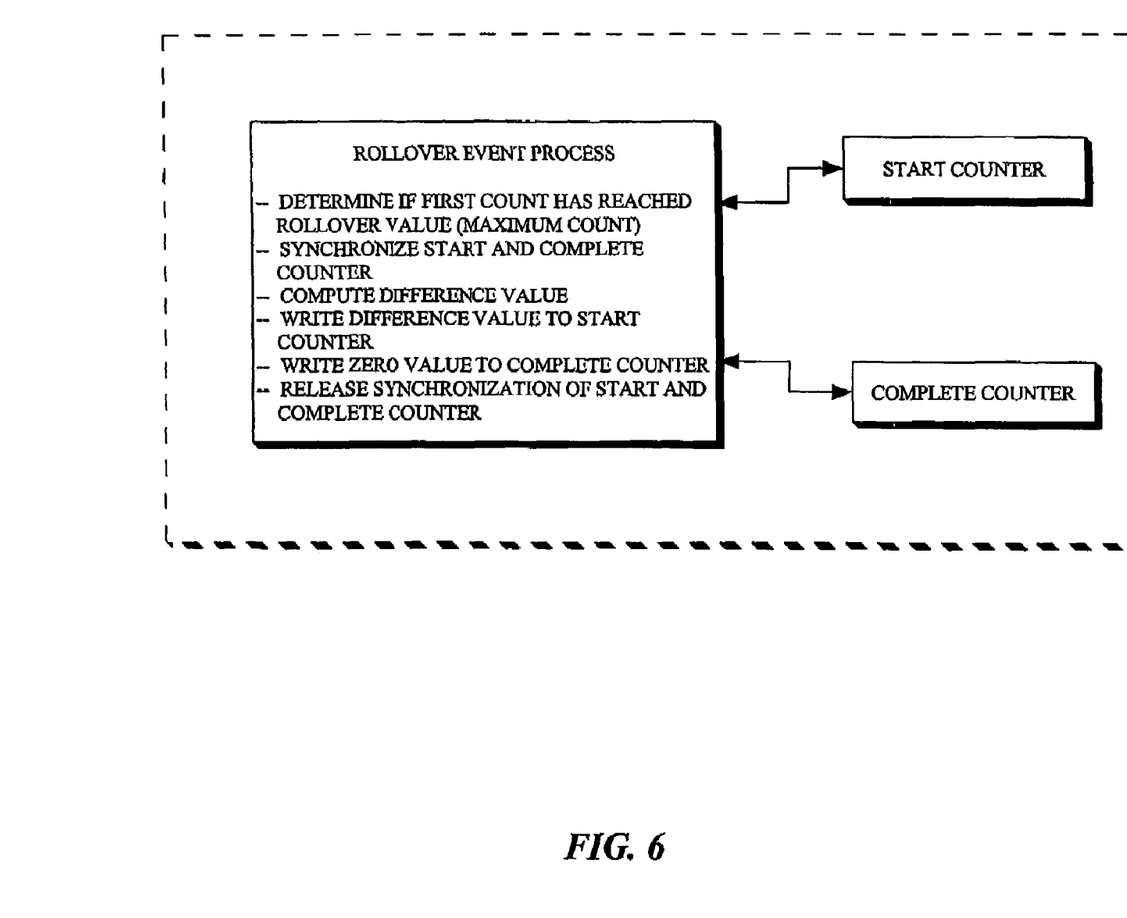
FIG. 6 is a block diagram representation of the rollover event process executing upon the counter of the present invention.

A method of handling the condition where either of the first or second counters reaches a maximum value is illustrated in FIGS. 4 and 6. When the first or second counter reaches its maximum value, the present invention enables the first or second counter to rollover back to zero. In an exemplary embodiment of the present invention, the first counter is the start counter and the second counter is the complete counter.

In a preferred embodiment, a rollover event process 400 of the present invention, provides a computer readable rollover instructions set. The rollover event in step 402 determines if the first (start) counter has reached a maximum value. It being understood that the first counter establishes a first count which has a maximum value. The first (start) counter, in the present example, runs ahead of the second (complete) counter. Thus, the first counter has an equal or higher value than the second counter. This is understood because the second counter counts the events that have already been started. In this situation, the rollover event may be executed upon the first counter only as it reaches the maximum value before the second counter. When the first counter is determined to have reached its maximum value a synchronizing process occurs in step 404. The synchronizing provided by the rollover event locks the first (start) and second (complete) counters such that neither may be updated by either the first (start) event process or the second (complete) event process. The synchronization of the first and second counters enables both counters to be modified by the rollover event. It is understood that the frequency of use of the rollover event may be directly related to the size of the first and second counters. For example, with a 32-bit counter, the rollover event is executed for every $2^{32}$ or 4,294,967,296 event activated.

After synchronizing the first and second counters the rollover event initiates a computation of a difference value in step 406. The difference value is the difference in values between the first count of the first counter and the second count of the second counter. In the current example, the first counter is determined to have its first count at the maximum value. The second counter establishes a second count which may be established at various values. It is understood that the second count may be established at various values which are at least one less than a maximum value capable of being established upon the second counter. Thus, the difference value is established by subtracting the second count, of the second counter, from the maximum value established as the first count of the first counter. The difference value is then written to the first counter in step 408. Thus, the first counter has the value of its first count re-set to the difference value. It is understood that the first count, when operated upon by the rollover event of the present invention, may be established with various values. In preferred embodiments, the re-set value of the first count may be equal to or greater than one.

After the first count of the first counter is re-set as the difference value computed by the rollover event process, in step 410 the second count of the second counter is re-set to zero. It is understood that the rollover event process may re-set the second count to various values greater than zero without departing from the scope and spirit of the present invention. Once the re-setting of the first and second counters is complete the rollover event releases the synchronization of the first and second counters in step 412. The release of the synchronization enables the first and second counters to return to normal processing in step 414, enabling the maintenance of a running count of active events as described above.

In the exemplary embodiments of the present invention herein described the first and second counters have been enabled using value representations as the unit of measurement for maintaining the running count of active events and performing the rollover event. However, the first and second counters of the present invention may be enabled using various unit representations for the establishment and execution of the process described as may be contemplated by those of ordinary skill in the art. Further, the updating (incrementing) of the first and second counters may be understood to occur using equivalent unit magnitudes. For instance, the start counter adjusted 5 unit values for the start of an event may correspond with the complete counter being adjusted 5 unit values for the completion of the event. It is contemplated that the first and second counters may be updated using various unit representation values which may not be equivalent, as described above.

The first and second counters of the present invention may be enabled to be operated upon by multiple processes, such as multiple start events on the start counter or complete events on the complete counter, at the same time. It is further contemplated that the first and second counters may be enabled to direct the operation upon multiple processes attempting to access them.

Figure 5:
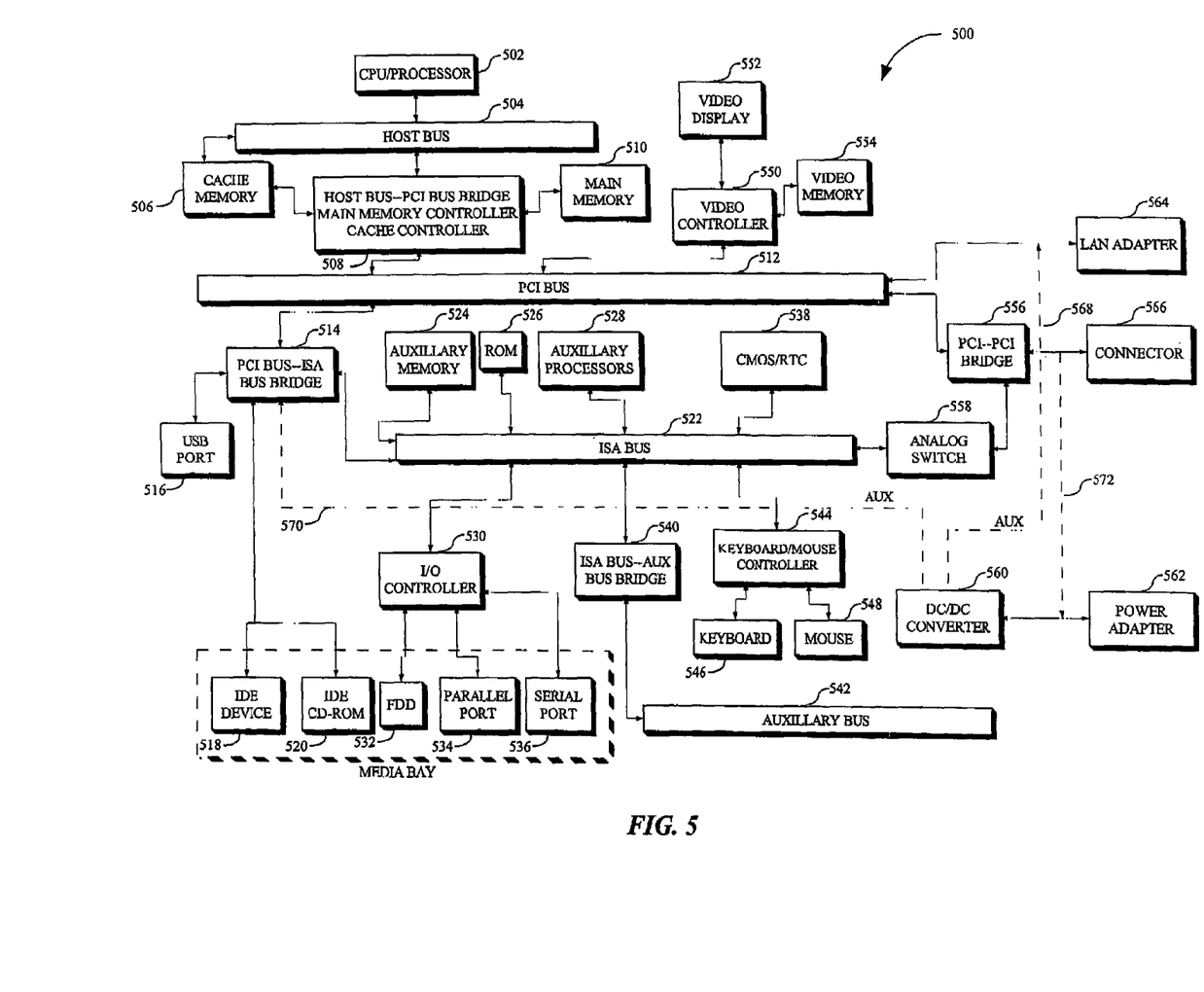
FIG. 5 is a block diagram representation of an exemplary computer for employing the counter of the present invention.

Referring now to FIG. 5, an exemplary hardware system 500 generally representative of an information handling system, such as a computer, sold or leased to host customers in accordance with the present invention is shown. For example, the computer may be a desktop personal computer (PC), a notebook PC, and the like. The hardware system 500 is controlled by a central processing system 502 (CPU). The central processing system 502 includes a central processing unit such as a microprocessor or microcontroller for executing programs, performing data manipulations and controlling the tasks of the hardware system 500. Communication with the central processor 502, by hardware components described later, is implemented through a high speed host bus 504. It is contemplated that the bus 504 may include a data channel for facilitating information transfer between storage and other peripheral components of the hardware system. The bus 504 may further provide the set of signals required for communication with the central processing system 502 including a data bus, address bus, and control bus.

In the preferred embodiment, the high speed host bus 504 connects with these hardware components through its pins, such as a PCI bus 512, an ISA bus 522, and an auxiliary bus 542. These buses provide for the transferring of information among the components of the hardware system 500.

In the current embodiment, a Host Bus-PCI Bus (HPCI) bridge circuit 508 enables communication between the host bus 504 and the PCI bus 512. In the current embodiment, the HPCI 508 includes a main memory controller and a cache controller. The main memory controller allows the HPCI 508 to control an operation for accessing main memory 510. This is accomplished by enabling the main memory controller with logic for mapping addresses to and from the CPU 502 to particular areas of the main memory 510. It is known that data transfer speeds differ between buses. Thus, the HPCI 508 further acts as a buffer to absorb any data transfer speed differences between the host bus 504 and the PCI bus 512.

The main memory 510 is a volatile random access memory (RAM) composed of a plurality of memory modules, typically DRAM (Dynamic RAM) chips. Other semiconductor-based memory types which may be employed with the hardware system 500 may include, for example, synchronous dynamic random access memory (SDRAM), Rambus dynamic random access memory (RDRAM), ferroelectric random access memory (FRAM), and so on. The main memory 510 provides storage of instructions and data for programs executing on the central processing system 502. The programs to be executed by the CPU 502 include device drivers that access an operating system (OS), or the like and peripheral devices, application programs for specified jobs, and firmware stored in a ROM 526 (described later). The memory capacity of the RAM may vary greatly, for example, ranging from 12 MB, to 64 MB, to 256 MB, to 512 MB. It is understood that the specific configuration of the main memory 510 may vary as contemplated by one of ordinary skill in the art.

A cache memory 506 is connected to the host bus 504 and the HPCI bridge 508. Cache memory is high-speed memory for temporary storage of limited amounts of code and data that the CPU 502 frequently accesses. The cache 506 operates to absorb the time required by the CPU 502 to access the main memory. In a preferred embodiment, the cache 506 may be implemented as an L-2 cache consisting of SRAM (Static RAM) chips, or the like with memory capacity as contemplated by one of ordinary skill in the art.

It is understood that the counter of the present invention may be enabled in various locations within the exemplary information handling system 500. For example, the counter may be located within the main memory 510. Alternatively, the counter may be located within the cache memory 506. It is contemplated that the information handling system 500 may include other memory locations and that the counter and the methods of the present invention may be enabled in these various memories.

The buses 504, 512, 522, and 542, may comprise any state of the art bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on.

In the preferred embodiment, the PCI bus 512 provides a relatively fast data transfer rate and directly communicates with devices such as the video controller 550. The video controller 550 couples with the video memory 554 and a video display 552. Graphic commands or the like are received from the CPU 502 by the video controller 550. The commands are processed and then temporarily stored in the video memory 554 before being output as graphics upon the video display 552. Common to video controllers is a digital to analog converter which converts a video signal to an analog signal. The analog signal may be output through CRT ports or other communication assemblies, such as LAN docking connectors, and the like. Video memory 554 may be, for example, video random access memory (VRAM), synchronous graphics random access memory (SGRAM), windows random access memory (WRAM), and the like. The video display 552 may comprise a cathode ray-tube (CRT) type display such as a monitor or television, or may comprise an alternative type of display technology such as a projection-type CRT display, a liquid-crystal display (LCD) overhead projector display, an LCD display, a light-emitting diode (LED) display, a gas or plasma display, an electroluminescent display, a vacuum fluorescent display, a cathodoluminescent (field emission) display, a plasma-addressed liquid crystal (PALC) display, a high gain emissive display (HGED), and so forth.

Other devices such as card bus controllers and the like are also typically in direct communicative contact with the PCI bus. PCI card slots are commonly found on many computers being formed in the wall or face of the computer. PC cards which conform to certain industry standards, such as those determined by the PCMCIA or JEIDA, may be used within these slots. Card bus controllers directly transmit PCI bus signals to the interface connector of a PCI card slot.

In situations where the PCI bus 512 is being tasked to interconnect with a secondary PCI bus, downstream of the PCI bus 512, a bridge circuit may be provided. In the current embodiment that bridge circuit may be identified as PCI-PCI bridge 556. An example of when this functionality may be needed is when the system 500 is a notebook computer. The notebook computer may use connector 566 to dock with and communicate with an expansion station. The expansion station may include a PCI bus as part of its hardware arrangement and connection between it and the PCI bus 512 may be enabled through the PCI-PCI Bridge 556. When a secondary PCI bus is not connected downstream, the bridge 556 may be disabled by disabling the PCI bus 512 signals at the end of the PCI bus 512. The connector 566 may be enabled as a communication subsystem and while shown coupled with the PCI bus 512 it may also couple with the ISA bus 522 for allowing the system 500 to communicate with a remote information handling system.

The present embodiment shows that the PCI bus 512 is coupled with the ISA bus 522 via a PCI Bus-ISA Bus Bridge (PCISA) 514. The PCISA 514 includes a USB route controller for connecting a USB port 516. USB devices, such as a digital camera, MP-1, tablet, mouse, and the like, may be inserted and removed from the USB port 516 while the system 500 is operating, and the hardware system 500 may provide a plug-and-play capability for reconfiguring the system configuration once a USB device has been identified. The USB router controller may further enable the operation of a peripheral USB and a general purpose bus. The PCISA 514 additionally includes an IDE (Integrated Drive Electronics) interface. This interface connects external storage devices that conform to the IDE specifications. In this manner data transfer between an IDE device 518 and the main memory 510 may occur without passing through the CPU 502. IDE device 518 may include DVD drives, HDD (hard disk drives), and the like. An IDE CD-ROM 520 is also connected with the IDE interface, preferably using an ATAPI (AT Attachment Packet Interface). The IDE device 518 and IDE CD-ROM 520 are typically located in a "media bay" of the computer. This "media bay" is usually situated for interaction by a user with its various components, which makes using the various devices easier. Other devices, which will be discussed later, may also be included within the "media bay".

The PCI bus 512 and the ISA bus 522 are connected by the PCISA Bridge 514 allowing communication between those devices coupled with the ISA bus 522 and the CPU 502, when needed. The PCISA Bridge 514 includes power management circuitry which is coupled via AUX II with a power adapter 562 that brings power in from a power supply to the system 500. The power management circuitry allows the hardware system 500 to change between various power states, such as normal operating state, off, suspend, and the like. Enough power is supplied to the hardware system 500 so that when it is in the off or suspend state, the hardware system 500 can monitor for events which cause the system 500 to be re-enabled. In the present embodiment the power management circuitry is also enabled as a controller for the auxiliary bus 542 coupled through an ISA bus-AUX bus bridge 540 to the ISA bus 522. The ISA bus-AUX bus bridge 540 is a low speed bus, and it is contemplated that the auxiliary bus 542 may be enabled as a system management (SM) bus for enabling the functioning of a LAN adapter 564 (both the SM bus and LAN adapter will be discussed later). The power management circuitry may be further enabled as a programmable interval timer (PIT) which is configurable by a user to expire after a predetermined period of time. For example, when the timer expires, the hardware system 500 will change from the off state to the normal operating state. It is further contemplated that the PCISA Bridge 514 may include a DMA controller and a programmable interrupt controller (PIC). The DMA controller may be used for performing a data transfer between a peripheral device and the main memory 510 that the data does not pass through the CPU 502. The PIC may execute a program (an interrupt handler) in response to an interrupt request from a peripheral device to which it is coupled.

The ISA bus 522 connects with an auxiliary memory 524, ROM 526, auxiliary processors 528, a CMOS/RTC 538

(CMOS=Complementary Metal Oxide Semiconductor), an I/O controller 530, the ISA bus-AUX bus bridge 540, a keyboard/mouse controller 544, and an analog switch 558. Typically, the ISA bus 522 transfers data at a lower speed than the PCI bus 512. The auxiliary memory 524 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 524 may also include a variety of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The auxiliary memory 524 may provide a variety of functionalities to the hardware system 500, such as the storage of instructions and data that are loaded into the main memory 510 before execution. In this way, the auxiliary memory 524 acts in a very similar manner to the ROM 526, described below.

The ROM 526 is a non-volatile memory for the permanent storage of a code group, such as a BIOS (Basic Input/Output System) or the like having input and output signals for hardware components, such as a floppy disk drive (FDD) 532, a keyboard 546, and a mouse 548. Additionally the ROM provides for the permanent storage of firmware, such as a test program like a POST (Power on Self Test) or the like that is run when the hardware system 500 is first powered on. It is understood that the hardware system 500 may include both the auxiliary memory 524 and the ROM 526 or be enabled with only one of these memory devices without departing from the scope and spirit of the present invention.

The hardware system 500 includes an auxiliary processing system 528 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that the system 500 may employ such auxiliary processors as discrete processors, processors built in to the main processor, or may not include such processors at all.

The CMOS/RTC 538 is a chip which includes an RTC (real time clock) which is used for time of day calculations and the CMOS memory. The CMOS memory is typically used to store information, such as BIOS setup values, passwords, and vital parts of a system configuration.

The I/O controller 530 provides interface functionality between the one or more I/O devices 532-536 and the ISA bus 522. I/O devices include FDD 532, Parallel Port 532, and a Serial Port 536, in the present embodiment. It is contemplated that the I/O controller 512 may interface with the universal serial bus (USB) port 516, an IEEE 1394 serial bus port, infrared port, network adapter, printer adapter, radio-frequency (RF) communications adapter, universal asynchronous receiver-transmitter (UART) port, and the like. Further, it is contemplated that the I/O controller 530 may provide for the interfacing between corresponding I/O devices such as the keyboard 546, the mouse 548, trackball, touchpad, joystick, trackstick, infrared transducers, printer, modem, RF modem, bar code reader, charge-coupled device (CCD) reader, scanner, compact disc (CD) drive, compact disc read-only memory (CD-ROM) drive 520, digital versatile disc (DVD) drive, video capture device, TV tuner card, touch screen, stylus, electro acoustic transducer, microphone, speaker, audio amplifier, and the like. The I/O controller 530 and I/O devices 532-536 may provide or receive analog or digital signals for communication between the hardware system 500 of the present invention and external devices, networks, or information sources. The I/O controller 530 and I/O devices 532-536 preferably implement industry promulgated architecture standards, including Ethernet IEEE 802 standards (e.g., IEEE 802.3 for broadband and base band networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 500 of FIG. 5 by one having ordinary skill in the art would not depart from the scope or the spirit of the present invention.

In the preferred embodiment, the keyboard/mouse controller 544 is enabled for fetching input provided through use of the keyboard 546 and/or the mouse 548. In an alternative embodiment, it is contemplated that the functionality performed by the keyboard/mouse controller 544 may reside in the I/O controller 530. Other controllers, such as an audio signal controller for processing the input/output of audio signals may be included within the hardware system 500. An analog switch 558 couples the ISA bus 522 with the connector 566. The analog switch 558, responding to whether or not a secondary PCI bus is connected with the hardware system 500, weakens the signal at the end of the ISA bus 522 and disconnects the ISA bus 522 from the connector 566.

A power adapter 562 for transforming an external AC power source into a DC voltage is coupled with a DC/DC converter 560. The DC/DC converter 560 provides a stable DC voltage to the components of the hardware system 500. It is contemplated that power may be received via the connector 566 by the DC/DC converter 560 and then reduced and stabilized for use by the hardware system 500. In this case, the power is carried along a power feed line 572 to the DC/DC converter 560. The PCISA Bridge 514 is supplied with auxiliary power via a power feed line 570 from the DC/DC converter 560. A LAN adapter 564 (described later) receives auxiliary power via a power feed line 568 from the DC/DC converter 560. This auxiliary power source may be required when the system 500 is enabled in an "off" state. For example, when the hardware system 500 is "off" the PCISA Bridge 114 may need to monitor the hardware system 100 for events which may cause the hardware system 500 to be re-enabled. In the LAN adapter 564, auxiliary power may be required for scanning all inputs received from the LAN. The LAN adapter 564 may scan for a particular data frame coupled with the input from the LAN and, if the data frame is not found refuse the input. If the data frame is found, the LAN adapter 564 may alert (i.e., WOL) the PCISA Bridge 514, including the power management circuitry, to power the hardware system 500 to a normal operating state.

While the hardware system 500 will be referenced during description of the present invention, it is understood that the configuration of the hardware system 500 may be varied, as contemplated by one of ordinary skill in the art, without departing from the scope and spirit of the present invention. For example, the type of CPU/Processor used may vary and the type and number of controllers, busses, and devices connected to the CPU/Processor may also vary.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus for maintaining a count of active events executed by a computer, comprising:
   a first counter updated by a first event of a process;
   and a second counter updated by a second event of the process,
   wherein the count of active events is established by comparing the first counter and the second counter, the first and second counters capable of being executed upon by a computer readable rollover event process, whereby the first or second counter maintaining counts of active events, when one of the first or second counter reaches a maximum value.

2. The apparatus of claim 1, wherein the first event includes a start event.

3. The apparatus of claim 2, wherein the first counter is incremented by the start event.

4. The apparatus of claim 1, wherein the second event includes a complete event.

5. The apparatus of claim 4, wherein the second event counter is incremented by the complete event.

6. The apparatus of claim 1, wherein the count of active events is from at least two asynchronous processes.

7. The apparatus of claim 1, further comprising:
   a first process for updating the first counter by a start event; and
   a second process for updating the second counter by a complete event.

8. The apparatus of claim 7, wherein the first process is executed by a first processor and the second process is executed by a second processor.

9. The apparatus of claim 8, wherein at least three processors update the first and second counter.

10. A computer system for maintaining a count of active events, comprising:
    a processor coupled with a memory, the processor for execution of a process;
    a first counter including a first count, disposed within the memory and communicatively coupled with the processor, the first counter having the first count updated by a start event of the process; and
    a second counter including a second count, disposed within the memory and communicatively coupled with the processor, the second counter having the second count updated by a complete event of the process,
    wherein the first and second counters establish the count of active events upon the computer by comparing the first count and the second count, the first and second counters capable of being executed upon by a computer readable rollover event process, whereby the first or second counter maintaining counts of active events, when one of the first or second counter reaches a maximum value.

11. The computer of claim 10, wherein the start event comprises the initialization of the process.

12. The computer of claim 10, wherein the complete event comprises the completion of the process.

13. The computer of claim 10, wherein the first counter is incremented by the start event.

14. The computer of claim 10, wherein the second event counter is incremented by the complete event.

15. The computer of claim 10, wherein the count of active processes is at least two asynchronous active processes.

16. The computer of claim 10, further comprising:
    a first process for updating the first counter by the start event; and
    a second process for updating the second counter by the complete event.

17. The computer of claim 16, wherein the first process is executed by a first processor and the second process is executed by a second processor.

18. The computer of claim 17, wherein at least three processors update the first and second counter.

19. A method of maintaining a count of active events being executed upon a computer, comprising:
    enabling the computer to execute a process;
    establishing a first counter updated by a start event of the process;
    establishing a second counter updated by a complete event of the process;
    incrementing a first count of the first counter upon the execution of the start event of the process;
    incrementing a second count of the second counter upon the execution of the complete event of the process;
    determining the count of active events by comparing the first count and the second count; and
    executing a computer readable rollover event process on the first counter and the second counter, whereby the first or second counter maintaining counts of active events, when one of the first or second counter reaches a maximum value.

20. The method of claim 19, wherein the start event comprises the initialization of the process.

21. The method of claim 19, wherein the complete event comprises the completion of the process.

22. The method of claim 19, wherein the count of active processes is at least two asynchronous active processes.

* * * * *